United States Patent [19]

Brown et al.

[11] Patent Number: 5,067,935
[45] Date of Patent: Nov. 26, 1991

[54] INTERAXLE DIFFERENTIAL

[75] Inventors: Anthony K. Brown, Exeter, England; Alvin A. Choma, Grosse Pointe Farms; Timothy R. Edwards, Warren, both of Mich.

[73] Assignee: Dyneer Corporation, Scottsdale, Ariz.

[21] Appl. No.: 524,739

[22] Filed: May 17, 1990

[51] Int. Cl.⁵ ............................................. F16H 37/08
[52] U.S. Cl. .................................... 475/248; 180/249
[58] Field of Search ............... 475/248, 249, 250, 221; 180/249, 250

[56] References Cited

U.S. PATENT DOCUMENTS

| | | | |
|---|---|---|---|
| 1,351,084 | 8/1920 | Winther | 180/250 |
| 1,717,784 | 11/1925 | Johnson | 475/248 X |
| 3,295,625 | 1/1967 | Ordorica et al. | 180/249 |
| 3,378,093 | 4/1968 | Hill | 475/221 X |
| 3,451,496 | 6/1969 | Myers | 180/23 |
| 3,505,902 | 4/1970 | Myers | 180/23 |
| 4,846,010 | 7/1989 | Fujikawa et al. | 180/249 X |
| 4,873,892 | 10/1989 | Ohkubo | 180/249 X |

OTHER PUBLICATIONS

Society of Automotive Engineers Technical Bulletin 700724, "Concepts and Applications of Interaxle Differentials", Jerry L. Hart, Sep. 14, 1970.

Primary Examiner—Allan D. Herrmann
Assistant Examiner—Ryan Massey
Attorney, Agent, or Firm—Laubscher, Presta & Laubscher

[57] ABSTRACT

An interaxle differential includes a central drive member that continuously connects an input shaft with a first output shaft, a clutch disk normally connecting the central drive member with a second output shaft, a rotational velocity responsive device operable from a deactivated position to an activated position for disengaging the clutch disk when the second output shaft overruns the first output shaft by a given value, a fail safe device for biasing the velocity responsive device toward its deactivated position, a first device for displacing the velocity responsive device toward the activated position, and an override device for selectively disengaging the clutch disk. In a second embodiment, the rear clutch disk is operable by the operator to disconnect the interaxle differential from the first output shaft, thereby to avoid the trapping of torque within the interaxle differential when the vehicle is maneuvered downhill in a turn.

10 Claims, 4 Drawing Sheets

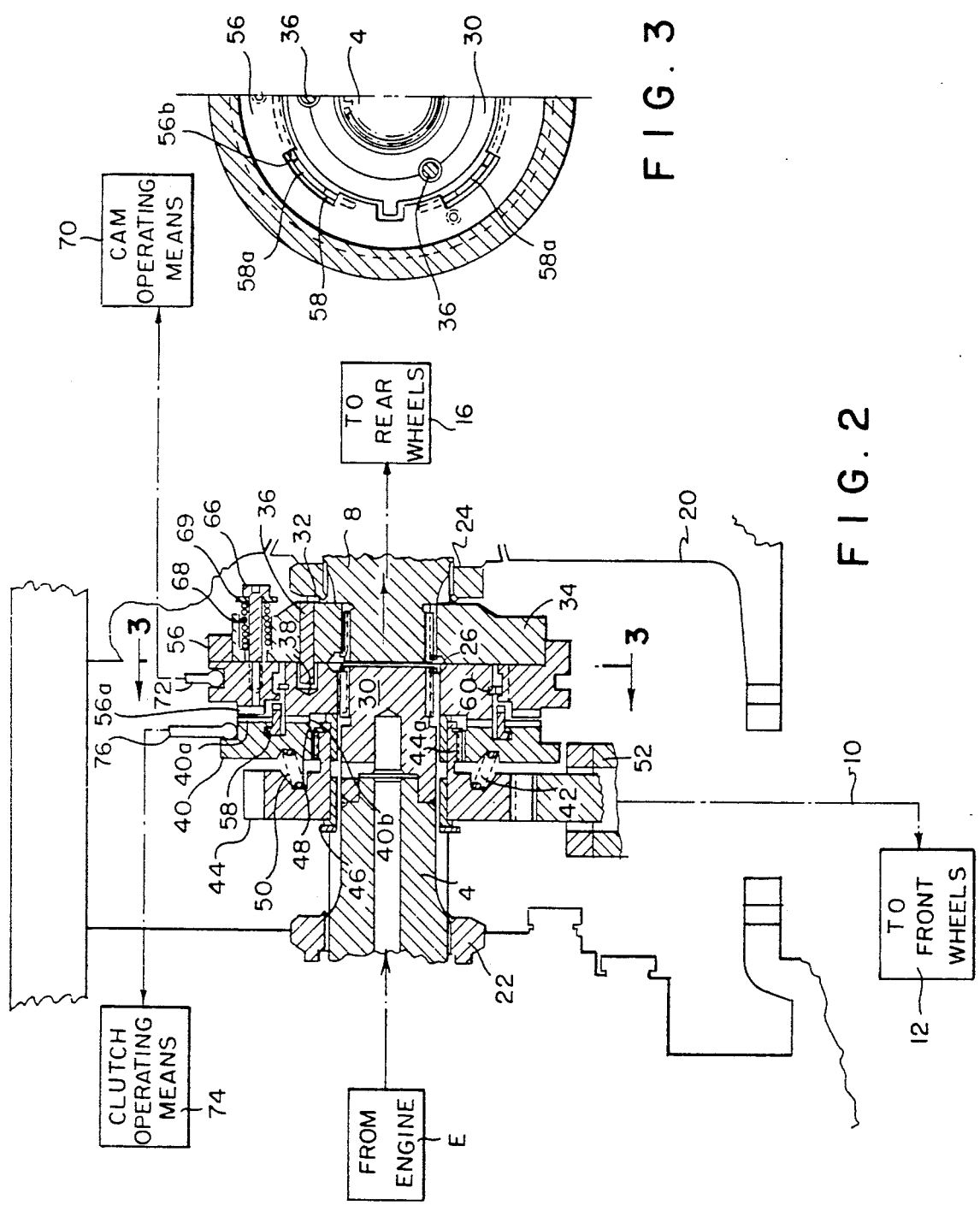

INTERAXLE DIFFERENTIAL

BRIEF DESCRIPTION OF THE PRIOR ART

Interaxle differentials for selectively connecting an input shaft to one or both of a pair of output shafts are well known in the prior art. As evidenced by the patents to Myers U.S. Pat. Nos. 3,451,496 and 3,505,902, it is customary to provide such interaxle differentials with center cam means for disengaging a clutch disk associated with one of the shafts when the rotational velocity of one shaft exceeds that of another shaft by a given value, holdout ring means being provided for maintaining the shafts in the disengaged condition as long as the overrunning condition exists. Of background interest also is the Society of Automotive Engineers Technical Bulletin 700724, "Concepts and Applications of Interaxle Differentials", Sept. 14, 1970.

In the operation of certain 4-wheel drive vehicles, particularly in vehicles such as tractors or fork lifts having front steering drive wheels and rear drive wheels, one problem that occurs during a turn is that one of the steering drive wheels requires a higher rotational velocity than is permitted by the axle differential through which the wheels are connected. In the absence of any interaxle differential, when a tractor is in a four-wheel drive condition, it is solidly connected between the front and rear axles, thereby resulting in undesirable trapped torque/wind-up conditions, giving use to objectionable steering related characteristics. The trapped torque can also prevent disconnect into two-wheel drive when a dog clutch is employed. Moreover, it is difficult to disconnect the steerable drive wheels when a two-wheel drive condition is desired (such as during roading of the vehicle, or when making a tight turn).

The present invention was developed to provide an interaxle differential between the front and rear axle differentials of a four-wheel drive vehicle (such as an agricultural tractor), thereby to eliminate trapped torque and ensure that the front axle is disconnected when its rotational velocity (due primarily to steering geometry) is greater than that of the rear axle. Consequently, the requirement of a manually applied 4WD/2WD disconnect is eliminated, and improved performance is provided for turning circles and for decreasing ground damage, while at the same time insuring correct selection of 4WD or 2WD.

SUMMARY OF THE INVENTION

Accordingly, the present invention was developed to provide an improved interaxle differential for 4-wheel drive vehicles such as agricultural tractors, which differential normally connects the input shaft to the non-steerable drive wheels, and which normally connects the input shaft with the drive shaft to the steerable wheels, velocity responsive means being provided for automatically disconnecting the drive to the steerable wheels when the turn angle of the vehicle exceeds a given amount (i.e., a turn angle on the order of 8° to 12°, or 38° to 44°, depending on the type of axle differential used with the steerable front wheels). In the preferred embodiment, the velocity responsive means is in the form of a center cam member and a holdout ring. In a second embodiment, operator-controlled means are provided for disconnecting the drive to the driven rear wheels (for example, during downhill operation of the tractor).

According to a further object of the invention, the interaxle differential affords selective operation between the 2-wheel and 4-wheel drive conditions, and permits selective de-activation of the velocity responsive disconnect means without adversely affecting vehicle operation. The drive to the steerable wheels is disconnected automatically during an excess turn condition, with no disconnect of the steerable wheels occurring during the coasting or downhill operating mode. The braking torque from the engine and/or brakes associated with the driven wheels is automatically transferred at all times to both axles. Moreover, the performance of the interaxle differential is the same in both the forward and reverse directions. The interaxle differential is operable in combination with any type of axle differential for the steerable wheels (i.e., any standard (conventional) or traction-adding differentials).

According to a further object, fail-safe means are provided for automatically deactivating the velocity responsive means in the event of failure of the hydraulic system.

Another object of the invention is to provide a modified embodiment of the interaxle differential including operator-controlled means for disconnecting the drive to the driven rear wheels (for example, when going downhill during a turn), thereby to relieve trapped torque and drive line wind-up.

BRIEF DESCRIPTION OF THE DRAWING

Other objects and advantages of the invention will become apparent from a study of the following specification when viewed in the light of the accompanying drawing, in which:

FIG. 2 is a detailed longitudinal sectional view of the interaxle differential of the present invention;

FIG. 3 is a sectional view taken along line 3—3 of FIG. 2;

DETAILED DESCRIPTION

Figure 1:
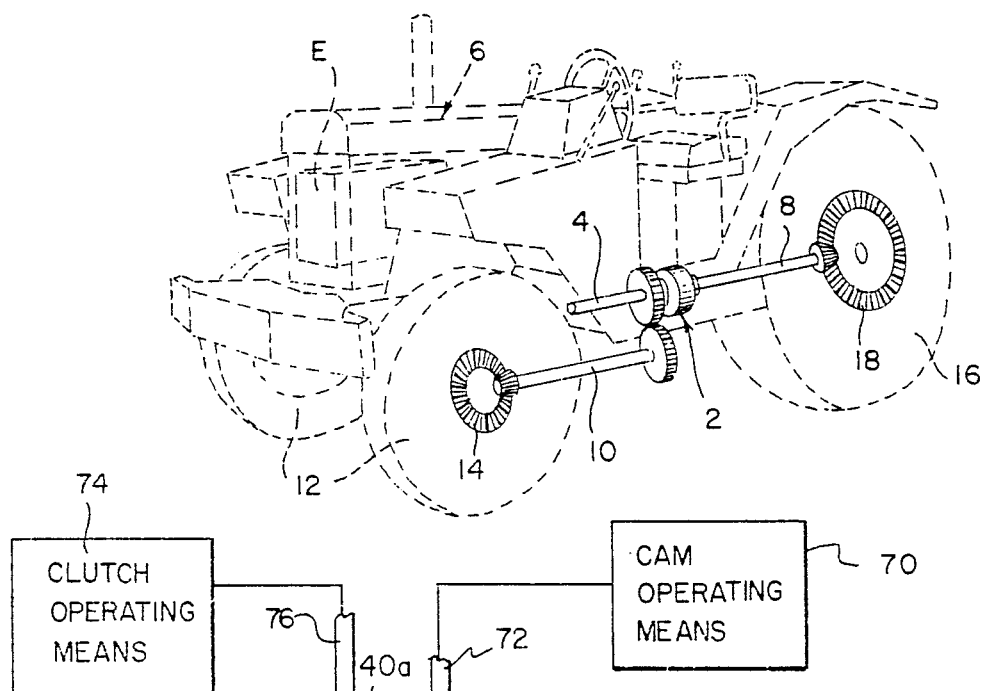
FIG. 1 is a perspective schematic view of a tractor including the interaxle differential of the present invention.

Referring first more particularly to FIG. 1, the interaxle differential 2 of the present invention connects the drive shaft 4 from the engine E of a tractor 6 with the front drive shaft 10 for driving the steerable front wheels 12 via front wheel differential 14, and with the rear wheel drive shaft 8 for driving the tractor rear wheels 16 via a conventional differential 18. As will be described in greater detail below, the input drive shaft 4 is normally connected by the interaxle differential 2 with the rear drive shaft 8, thereby causing the tractor rear wheels 16 to be continuously driven via the differential 18. In accordance with the present invention, the front wheel drive shaft 10 is connected with the input drive shaft 4 via the differential 2 as long as the rotational velocity of the front wheel drive shaft 10 is less than a given value relative to the rear wheel drive shaft 8. In the event that the rotational velocity of the front wheel drive shaft 10 exceeds that of the rear wheel drive shaft 8 by a predetermined value—such as occurs, for example, when the vehicle has a turn angle which is greater than about 8° to 12° (the steerable wheels being connected by a standard [conventional] axle differential or a torque-biasing differential)—the interaxle differential 2 operates to automatically disconnect the front wheel drive shaft 10 from the input shaft 4, whereby the front wheels 12 are in a free wheeling condition as long as the rotational velocity of the front wheel drive shaft 10 exceeds the predetermined value.

Referring now to FIGS. 2 and 3, the interaxle differential of the present invention includes a housing 20 having front and rear bearing means 22 and 24 in which the adjacent ends of the input shaft 4 and the rear wheel drive shaft 8 are journalled, respectively. Connected by splines 26 with the input shaft 4 is an annular central drive member 30. Similarly, there is splined to the rear output shaft 8 by spline means 32 an annular clutch disk 34 that is non-rotatably connected with the central drive member 30 by a plurality of dowel pins 36. Oversized clearance holes 38 are formed in the central drive member 30 for receiving the corresponding ends of the dowel pins 36, thereby to allow for normal clutch to central drive backlash. At its other end, the central drive member 30 is provided with clutch teeth 30a (FIG. 6) that engage corresponding clutch teeth 40b on the axially shiftable clutch disk 40 that is mounted for axial displacement on the splines 42 on the annular hub portion 44a of an output gear 44 rotatably supported on the input shaft 4. Thrust washer 46 supports output gear 44 against displacement to the left, and lock ring 48 limits the right hand extent of movement of the clutch disk 40 relative to the output gear 44. Annular biasing spring 50 normally biases clutch disk 40 to the right to effect engagement between the corresponding teeth on the clutch disk 40 and the central drive member 30. The output gear 44 drives the front wheel drive shaft 10 via a gear train 52.

Mounted for axial displacement on the central drive member 30 is an annular center cam member 56 having cam teeth 56a arranged to engage corresponding cam teeth 40a on the clutch member 40. A conventional angularly displaceable annular holdout ring 58 is rotatably mounted at one end in an annular groove for relative angular displacement on the clutch member 40, which holdout ring is provided with axially extending lugs 58a that normally extend within corresponding slots 56b contained within the inner periphery of the center cam member 56.

Split lock ring 60 mounted in the outer periphery of the central driver member 30 extends within a corresponding groove formed in the inner periphery of the center cam member 56, thereby to limit the extent of axial movement of the center cam member 56 relative to the central drive member 30.

In accordance with an important feature of the present invention, fail safe spring means are provided for normally biasing the center cam member 56 away from the output clutch disk 40, said biasing means including a plurality of helical fail-safe tension springs 68 concentrically mounted on bolts 66 each having at one end an enlarged head portion 66a, which bolts extend at their other ends through corresponding openings 34a for threaded connection at their free ends within corresponding threaded bores contained within the center cam member 56. Fail safe tension spring 68 is mounted between a washer 69 adjacent the head portion 66a of the bolt 66 and a reaction surface on the output clutch disk 34, thereby to bias the center cam member 56 to the right toward engagement with the output disk 34 when in the fail safe position shown in FIG. 6. It will be seen that when in the fail safe condition, the clutch member 40 reengages clutch teeth 40b with central drive teeth 30a in order to provide braking to both axles at all times.

Figure 4:
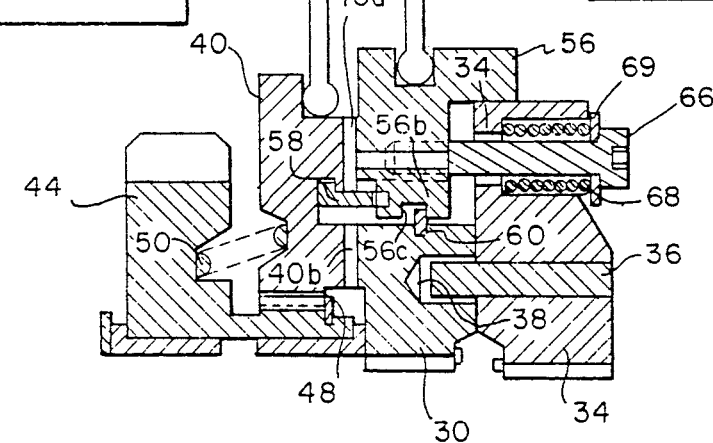
FIGS. 4-6 are detailed sectional views illustrating, respectively, the interaxle differential in the fully engaged condition, the disengaged condition with the center cam ring in the activated position, and the engaged condition with the center cam ring in the fail-safe de-activated position.
Figure 5:
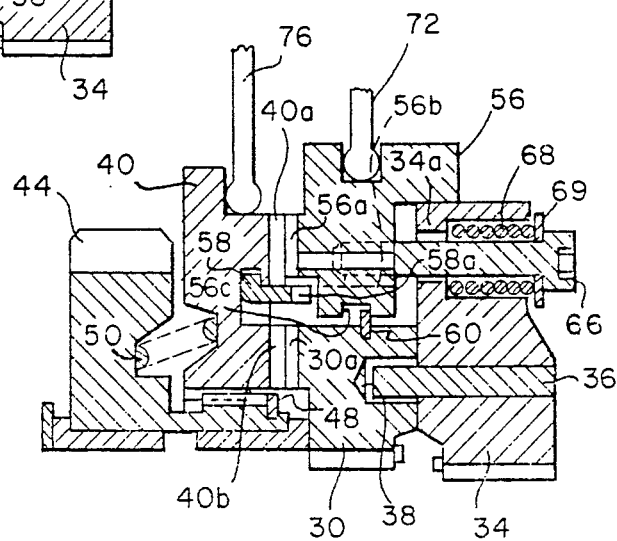
Figure 6:
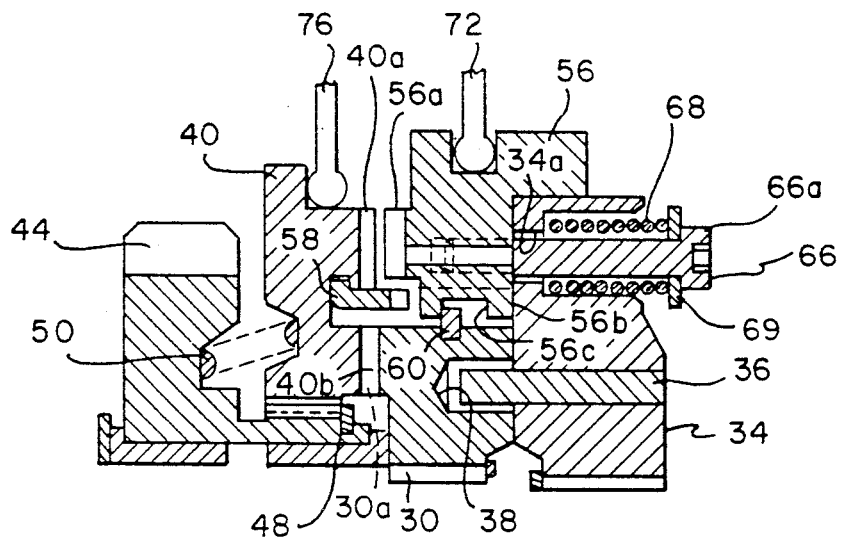
Figure 9:
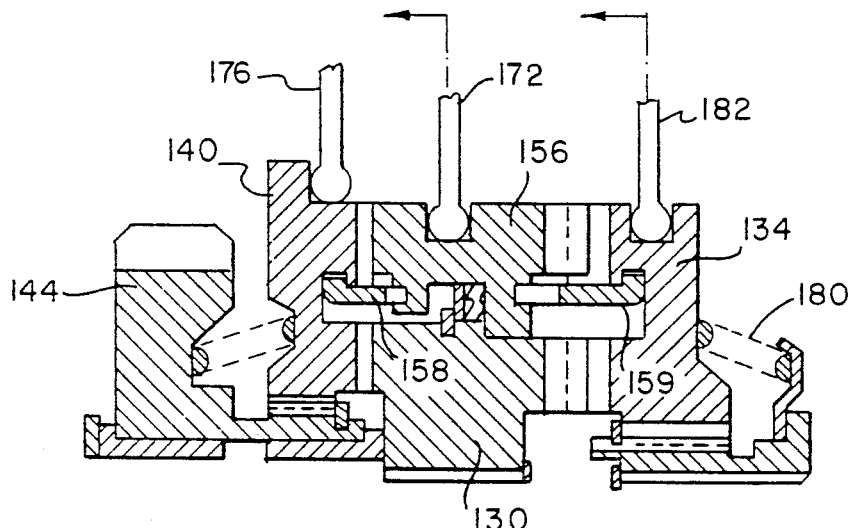
FIGS. 9 and 10 are detailed views of the apparatus of FIGS. 7 and 8, the rear clutch member being illustrated in the engaged and disengaged conditions, respectively.
Figure 10:
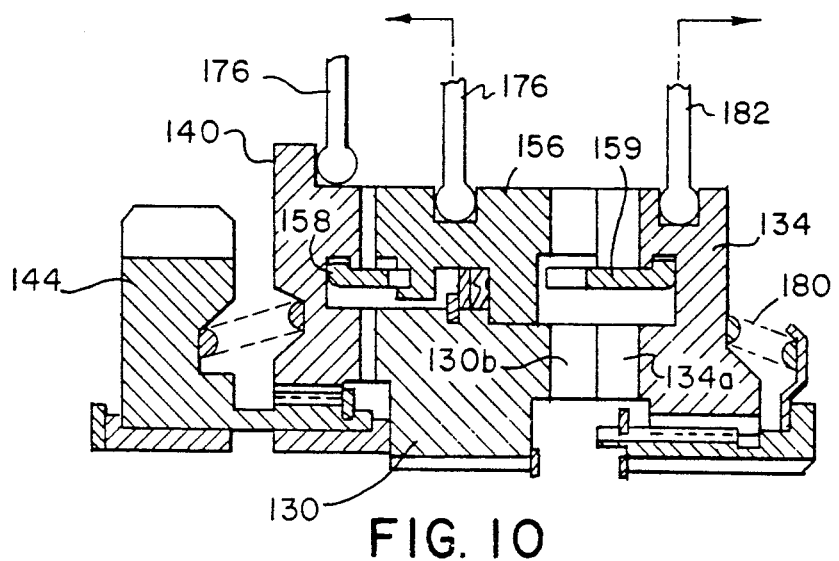

Cam operating means 70 of a mechanical or hydraulic type are provided including an operating lever 72 or collar that terminates an external annular groove in the center cam member 56, thereby to operate the cam member 56 from the deactivated fail safe position of FIG. 6 toward the activated position of FIGS. 4 and 5. Owing to the cooperation between split lock ring 60 on the external periphery of the central drive member 30 and the walls of the annular slot 56c formed in the inner periphery of the center cam member 56, axial movement of the center cam member 56 is limited between the positions shown in FIGS. 4–6. As indicated previously, in the event that the cam operating means 70 is deactivated (for example, by an interruption of the supply of the hydraulic fluid), the center cam member will be shifted to the right to the fail safe position of FIG. 6 by the fail safe springs 68 which causes the clutch member 40 to engage, thereby providing braking torque from the engine and/or brakes to both axles at all times. Similarly, clutch operating means 74 of the mechanical or hydraulic type are provided for operating a lever 76 or collar to shift the clutch disk 40 to the left against the restoring biasing force of spring 50, whereby the clutch disk is shifted to the disengaged position of FIG. 5, thereby to disengage the cam teeth 40a from the cam teeth 56a, and also to disengage the clutch teeth 40b from the driving teeth 30a of the central drive member 30. It will be seen that the clutch disk 40 is normally biased toward the engaged position of FIG. 4 by the biasing spring 50, thereby to normally maintain the clutch disk 40 in engagement with the central drive member 30, whereby the front drive shaft 10 is normally connected with the input drive shaft 4 and with the rear drive shaft 8 to effect 4-wheel drive.

OPERATION

In operation, assume that the interaxle differential is in the normal operating condition of FIG. 4, wherein the center cam member 56 has been displaced by cam operating means 70 to the illustrated activated position, and the clutch member 40 is in its normal position effecting four-wheel drive. Driving torque from the tractor engine E is transmitted from input shaft 4 to both the rear wheel drive shaft 8 and the front wheel drive shaft 10 by the interaxle differential 2. In the event that the front wheels 12 are turned by the operator to a turn angle greater than about 8° to 12°, the increased rotational velocity of the outer front wheel of the turn will increase the rotational velocity of the front shaft 10 relative to the input shaft 4 and the rear wheel drive shaft 8, whereby, as is known in the art, cam teeth 40a of the clutch member 40 will ride up upon the corresponding cam teeth 56a of the center cam member 56, thereby to disengage the clutch teeth 40b from the driving teeth 30a of the central drive member 30. Holdout ring 58 is rotated through a slight angle to a position in which the extremities of the holdout ring lugs 58a engage the corresponding end surface of the center cam member 56, thereby to maintain the clutch member 40 in a disengaged condition as long as the turn angle of the tractor exceeds the predetermined 8° to 12° value as shown in FIG. 5. Thus, the tractor is now in a 2-wheel drive condition, and the steerable front wheels 12 are free running. When the operator again straightens the vehicle to reduce the turn angle below 8° to 12°, the speed of the front shaft 10 is reduced, holdout ring 58 is angularly displaced to its deactivated position, and clutch spring 50 again biases clutch disk 40 to the right to effect engagement between the clutch teeth 40b and the central drive member teeth 30a, whereby the four-wheel drive condition is again established.

In the event that the operator should selectively desire to have two wheel drive operation, clutch operating means 74 are operated to displace the lever 76 to the left to the position of FIG. 5 whereby clutch disk 40 is shifted to the left to disengage clutch teeth 40b from the driving teeth 30a. Thus, the clutch is prevented from engaging the driving disk, and thereby maintain the vehicle in the two-wheel drive condition.

If desired, the operator can deactivate the overrunning sensing device of the present invention by operating the cam means 70 and lever 72 to displace center cam member 56 to the right to the deactivated fail-safe position of FIG. 6. When the center cam member 56 is moved to the right, front clutch member 40 automatically engages, thereby providing four wheel braking at all times. Lever 72 may be connected with the brake system (not shown) to insure four wheel braking each time the brakes are operated.

Many cost and functional advantages result from the elimination of the prior expensive 4×4/4×2 selector assembly and controls.

To reduce cost, the rear clutch 34 is driven by three dowel pins 36. Clearance holes 38 are drilled in the central drive member 30 to allow for normal clutch to central driver backlash. The rear clutch 34 contains three fail safe springs 68 each located on a socket head screw 66 with a washer 69. The springs withdraw the center cam 56 from the front clutch 40 so that disconnection can not occur when hydraulic pressure is lost, therefore, fail safe. The center cam has internal broached shoulders to allow the holdout ring lugs to rest when the front clutch is disengaged. An external groove is turned to allow for a shifting lever 72 or collar to hydraulically move the center cam forward and backward in and out of engagement with the front clutch. The front clutch 40 has an external step or collar to allow for a shifting lever 76 to hydraulically move the clutch away from the center cam to effect 2-wheel drive.

A special gear train 52 (helical or spur) is used to transmit drive to the front axle via the front clutch. Flange bushings are pressed to the I.D. to allow for proper rotation on the shaft. A thrust washer 46 is used to eliminate shaft wear due to the rotating gear.

While a disengagement turn angle of about 8° to 12° has been discussed in connection with a front axle differential of the standard (conventional) or torque biasing type, it is also contemplated that a front axle differential of the NOSPIN or speed sensitive type could be used in which the disengagement turn angle is on the order of 38° to 44°.

Figure 8:
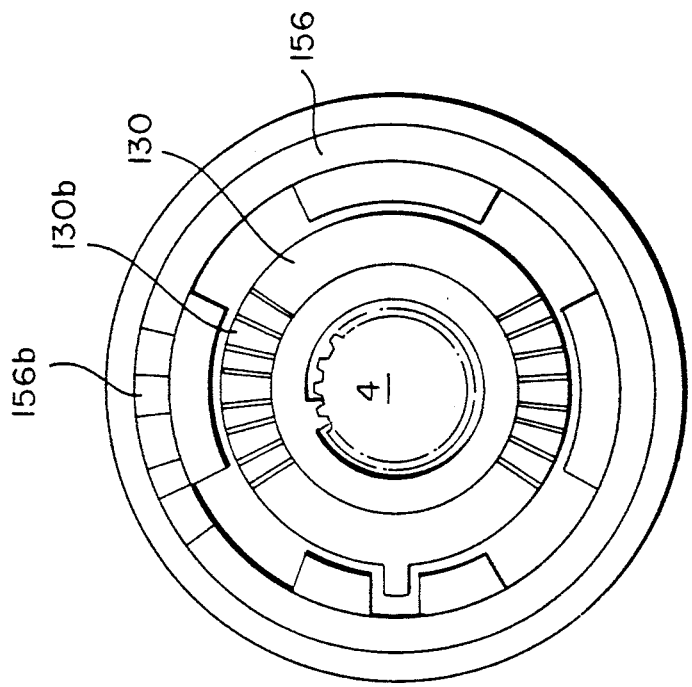
FIG. 8 is a sectional view taken along line 8—8 of FIG. 7 with the rear clutch member removed.
Figure 7:
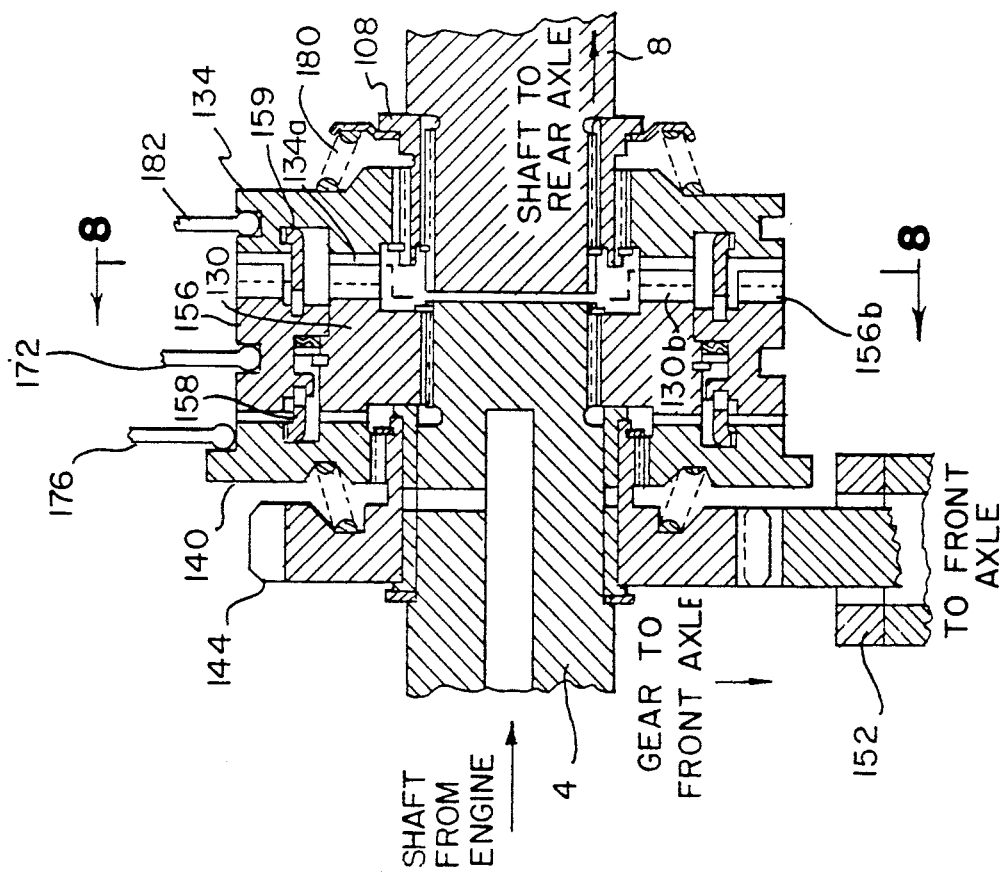
FIG. 7 is a longitudinal sectional view of a second embodiment of the invention having operator-controlled means for disconnecting the rear drive shaft from the rear axle differential.

Referring now to the modified embodiment of FIGS. 7 and 8, the rear clutch disk 134 is splined for axial displacement relative to the rear axle side gear 108, spring means 180 normally biasing clutch disk 134 to the left to effect engagement between clutch teeth 134a and corresponding teeth 130b on the central drive member 130. A third operator-controlled lever 182 is provided for shifting the clutch disk 134 to the right to disengage clutch teeth 134a from the teeth 130b of the central drive member. Thus, for example, when the vehicle is traveling down the hill in a turn, the front axle differential remains connected with the interaxle differential to insure engine braking, and the drive to the driven rear wheels may be disconnected by lever 182 to relieve trapped torque and drive line wind-up. The angularly displaceable holdout ring 159 maintains the clutch disk 134 in the disengaged condition. When the downhill maneuver is completed, the rear axle speed matches the speed of the front axle, whereby the holdout ring is angularly returned to its deactivated condition, and the clutch disk 134 is biased by spring 180 toward engagement with the central drive member.

While the preferred form and embodiment has been illustrated and described, various changes may be made without deviating from the inventive concepts set forth above.

What is claimed is:

1. An interaxle differential for selectively connecting an input shaft with a pair of output shafts one of which is longitudinally aligned with said input shaft, comprising:
   (a) means connecting said input shaft with said one output shaft;
   (b) clutch means normally connecting the other of said output shafts with said input shaft;
   (c) velocity responsive means operable from a deactivated condition to an activated condition for disengaging said clutch means when the rotational velocity of said other output shaft exceeds that of the input shaft by a given value;
   (d) fail safe means normally biasing said velocity responsive means toward its deactivated condition; and
   (e) means for operating said velocity responsive means from the deactivated condition to the activated condition.

2. Apparatus as defined in claim 1, and further including:
   (f) override means for disengaging said clutch means to disconnect said input shaft from said other output shaft.

3. Apparatus as defined in claim 2, wherein said clutch means includes an annular central drive member rigidly connected concentrically about said input shaft, a clutch disk mounted concentrically about said input shaft for axial displacement between engaged and disengaged positions relative to said central drive member, said clutch disk and said central drive member having cooperating clutch teeth, and clutch spring means normally biasing said clutch disk toward engagement with said central drive member;

and further wherein said velocity responsive means includes a center cam member arranged concentrically relative to said central drive member, said center cam member and said clutch disk having cooperating cam teeth for axially displacing said clutch disk to the disengaged position when the velocity of said other output shaft exceeds that of the input shaft by a given value, said center cam member being mounted for axial displacement relative to said central drive member between activated and deactivated positions relative to said clutch member.

4. Apparatus as defined in claim 3, wherein said fail safe means includes fail safe spring means biasing said center cam member toward the deactivated position.

5. Apparatus as defined in claim 4, wherein said means for operating said velocity means responsive means to the activated position includes a first lever connected with said center cam member.

6. Apparatus as defined in claim 5, wherein said override means for disengaging said clutch means includes a second lever.

7. Apparatus as defined in claim 3, wherein said clutch means includes an annular output gear journalled on said input shaft, said output gear having an annular hub portion upon which said clutch disk is splined for axial relative movement, and means connecting said output gear with said other output shaft.

8. Apparatus as defined in claim 7, wherein said means for connecting said input shaft with said one output shaft include a rear clutch disk splined to said one output shaft.

9. Apparatus as defined in claim 8, and further including dowel means extending axially between said rear clutch and said central drive member, thereby to prevent relative rotational movement between said rear clutch disk and said central drive member.

10. Apparatus as defined in claim 8, and further including means mounting said rear clutch disk for axial displacement on said one output shaft between engaged and disengaged positions relative to said central drive member, spring means biasing said rear clutch disk toward said engaged position, and third lever means for displacing said rear clutch disk toward the disengaged position.

* * * * *